United States Patent Office 3,641,160
Patented Feb. 8, 1972

3,641,160
ADDUCTS OF TETRABROMODIALKOXY CYCLO-
PENTADIENES AND ALLYL ALCOHOL
Richard Garth Pews, Midland, Clare R. Hand, Sanford, and Carleton W. Roberts, Midland, Mich., assignors to The Dow Chemical Company, Midland, Mich.
No Drawing. Original application Apr. 12, 1968, Ser. No. 721,106, now Patent No. 3,489,814, dated Jan. 13, 1970. Divided and this application June 16, 1969, Ser. No. 833,692
Int. Cl. C07c 43/18
U.S. Cl. 260—611 F
1 Claim

ABSTRACT OF THE DISCLOSURE

The invention concerns new compositions of matter that are the Diels-Alder adducts of tetrabromodialkoxy cyclopentadienes having the general formula $C_5Br_4(OR)_2$ wherein R is an alkyl radical having from 1 to 8 carbon atoms and allyl alcohol which compounds are useful for the control of pigweed, as flame-proofing agents and as fire retardants.

This application is a divisional application of our prior application Serial No. 721,106, filed April 12, 1968, and now patent No. 3,489,814.

This invention concerns new compositions of matter that are the adducts of tetrabromodialkoxy cyclopentadienes and allyl alcohol.

The tetrabromodialkoxy cyclopentadiene starting materials have the general formula

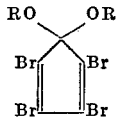

wherein R is an alkyl radical having from 1 to 8 carbon atoms. The compounds are prepared by reacting hexabromocyclopentadiene with an alkali metal alkoxide at temperatures between about 10° and minus 80° C. and at atmospheric pressure or thereabout. The reaction is illustrated by the equation for the dimethoxy compound as follows:

Other dialkoxy compounds are prepared by employing the corresponding alkali metal alkoxide, e.g., sodium ethoxide, potassium propoxide, sodium butoxide, sodium hexoxide or potassium octoxide, in the reaction with hexabromocyclopentadiene to form the corresponding derivatives.

The tetrabromodialkoxy cyclopentadienes undergo the Diels-Alder reaction with certain ethylenically unsaturated organic compounds to form other new compositions of matter.

We have found that the tetrabromodialkoxy cyclopentadienes having the above formula react with allyl alcohol to form the corresponding dienophiles.

The reaction can be carried out at tempeatures between about 80° and 200° C. and at atmospheric or superatmospheric pressure.

The new compositions are useful as the active ingredient of spray compositions for the control of pigweed. They are also useful as flame-proofing agents and as fire retardants when incorporated with flammable plastics such as polystyrene or polyethylene, or with paper or cellulose or cotton linters or cotton cloth.

The following example illustrates a way in which the invention can be practiced, but is not to be construed as limiting its scope.

EXAMPLE

A charge of 10 grams of tetrabromodimethoxycyclopentadiene and 10 ml. of allyl alcohol were sealed in a glass tube and heated at 140° C. for one hour. Thereafter it was heated up to 200° C. in a period of one hour and maintained at 200° C. for 30 minutes, then was cooled. The product was recovered and crystallized from hexane. There was obtained 4 grams of crystalline product melting at 89–90° C. It was analyzed and found to contain:

Theory $C_{10}H_{12}Br_4O_3$ (percent): C, 23.10; H, 2.42; Br, 63.99. Found (percent): C, 24.30; H, 2.38; Br, 63.4.

The compound has the structure

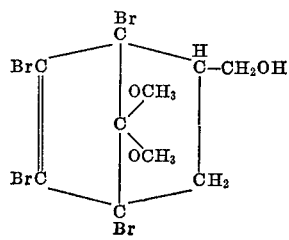

In tests of the compound as the active ingredient in spray compositions for control of pigweed it was found to give 100 percent kill at a concentration of 10 parts by weight per million parts of the spray composition. It is also useful as a starting material to make other chemical compounds, e.g. by reacting with acrylic or methacrylic acid to form the corresponding esters.

We claim:

1. An adduct that is the Diels-Alder reaction product prepared by heating a mixture of 1,2,3-4-tetrabromo-5,5-dimethyoxy cyclopentadiene and allyl alcohol.

References Cited

UNITED STATES PATENTS 2,697,103   12/1954   Ordas _____ 260—611 (F)

BERNARD HELFIN, Primary Examiner